United States Patent
Antony et al.

(10) Patent No.: US 7,191,228 B1
(45) Date of Patent: Mar. 13, 2007

(54) HEALTH CHECKER FOR EMS CORBA NOTIFICATION LISTENER

(75) Inventors: Sony Antony, Atlanta, GA (US); Harry Tang, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 782 days.

(21) Appl. No.: 10/259,616

(22) Filed: Sep. 30, 2002

Related U.S. Application Data

(63) Continuation-in-part of application No. 10/259,732, filed on Sep. 30, 2002.

(51) Int. Cl.
*G06F 15/173* (2006.01)

(52) U.S. Cl. .................. 709/224; 709/203; 709/224; 709/232; 710/15; 714/4; 714/24; 714/47; 714/48

(58) Field of Classification Search ............... 709/203, 709/224, 232, 223; 714/4, 24, 47, 48; 710/15
See application file for complete search history.

(56) References Cited

U.S. PATENT DOCUMENTS

| | | | | |
|---|---|---|---|---|
| 5,768,119 A * | 6/1998 | Havekost et al. | ............... | 700/4 |
| 5,796,393 A | 8/1998 | MacNaughton et al. | | |
| 5,958,010 A * | 9/1999 | Agarwal et al. | ............ | 709/224 |
| 6,052,722 A * | 4/2000 | Taghadoss | ................... | 709/223 |
| 6,161,136 A * | 12/2000 | Hyndman et al. | .......... | 709/223 |
| 6,260,062 B1 * | 7/2001 | Davis et al. | ................. | 709/223 |
| 6,324,587 B1 | 11/2001 | Trenbeath et al. | | |
| 6,349,335 B1 * | 2/2002 | Jenney | ....................... | 709/224 |
| 6,363,421 B2 * | 3/2002 | Barker et al. | ............... | 709/223 |
| 6,424,872 B1 * | 7/2002 | Glanzer et al. | ............... | 700/18 |
| 6,505,244 B1 | 1/2003 | Natarajan et al. | | |
| 6,564,341 B1 | 5/2003 | Sundaram et al. | | |
| 6,714,976 B1 * | 3/2004 | Wilson et al. | ............... | 709/224 |
| 6,901,440 B1 * | 5/2005 | Bimm et al. | ................. | 709/223 |
| 6,950,935 B1 | 9/2005 | Allavarpu et al. | | |
| 6,968,553 B1 * | 11/2005 | Theeten | ...................... | 719/311 |
| 6,970,919 B1 | 11/2005 | Doi et al. | | |
| 7,010,586 B1 | 3/2006 | Allavarpu et al. | | |
| 7,020,707 B2 * | 3/2006 | Sternagle | ..................... | 709/230 |
| 7,062,549 B1 * | 6/2006 | Miller et al. | ................. | 709/223 |
| 2002/0156930 A1 | 10/2002 | Velasquez | | |
| 2003/0055946 A1 * | 3/2003 | Amemiya | .................... | 709/224 |
| 2003/0084129 A1 * | 5/2003 | Nakamura et al. | .......... | 709/220 |

OTHER PUBLICATIONS

Technical Report, Protocol Independent Object Model for ADSL EMS-NMS Interface, Mar. 2000.

* cited by examiner

*Primary Examiner*—Saleh Najjar
*Assistant Examiner*—Michael Won
(74) *Attorney, Agent, or Firm*—Withers & Keys, LLC

(57) ABSTRACT

A system and method is described for checking the health status of a communication pathways between an EMS and a notification listener that receives notification signals from the EMS when changes have occurred in a downstream electronic system architecture.

12 Claims, 4 Drawing Sheets

HEALTH CHECKER FOR EMS CORBA NOTIFICATION LISTENER

This application is a continuation-in-part of U.S. patent application Ser. No. 10/259,732 titled "NMS CORBA Listener for EMS Signals", filed Sep. 30, 2002, which is incorporated by reference herein in its entirety.

BACKGROUND

1. Field of the Invention

The present invention relates to systems and methods for determining the proper functioning status of listening processes for monitoring communications between electronic components connected via a network. More particularly, the present invention relates to systems and methods for determining the operational status of listening processes that receive information regarding changes in downstream architecture and relay such information upstream using a CORBA interface.

2. Background of the Invention

In the increasingly sophisticated field of electronic communication, particularly between electronic systems or machines, the TL-1 line protocol has remained a common industry standard. TL-1 lines are used as a communication medium between different electronic systems or machines, particularly in Internet- and telecommunication-related systems. However, TL-1 commands are typically very specific and limited to the type of systems or machines that utilize such lines. For example, each distinct system component may require its own unique TL-1 commands or inputs that take into account the specifics of the particular component.

Such a need for detailed characteristics makes use of TL-1 commands generally complicated and time-consuming. Further, TL-1 commands used by different system components make it difficult for the components to communicate with one another, even though all use the general TL-1 command protocol. Finally, much detail is required to determine the specific programming characteristics of each hardware component that is being connected with a given TL-1 line. Thus, although ubiquitously used, TL-1 lines have a number of limiting characteristics.

One of the most limiting characteristics of a TL-1 line is that it does not allow for efficient communication between interconnected hardware. For example, if a change is made in a downstream component of an electronic system, it would be very difficult for an upstream component to receive "real-time" information about that specific downstream change. Typically, when a downstream change is currently made to, for example, a component of a system, such change is communicated to an upstream programmer by the person who has made such a change in the downstream component. Such a requirement for the person who creates changes to communicate them "manually" to upstream programmers is inefficient and prone to errors, such as when the person forgets to relay such information to upstream programmers.

As a further non-limiting example, if an electronic switch or card is changed in a downstream component of an electronic network, TL-1 lines connecting the series of network components to an upstream programmer would not efficiently allow the programmer to be cognizant of the change. Such a programmer may receive some indication that a change was made in that specific downstream component if the programmer sends a specific command related to that changed component and the component responds, because of the change, in a way that the programmer was not expecting. This conventional "reactive" method of determining changes downstream is inefficient and prone to errors, particularly when the upstream programmer is not aware of the downstream changes.

Thus, there is a need for systems or methods that automatically update the status of a system architecture as it changes in "real time" in an effective and efficient manner. Additionally, there is a further need for a central processing center to receive all the information from downstream components, and reforms the information into a universal language that is understandable by an upstream component. To that end, there is a need for an automated system health checker that determines whether the communication pathways between the downstream components and the central processing center is viable or not.

SUMMARY OF THE INVENTION

In exemplary embodiments of the present invention, systems and methods are presented that verify and determine the operational status of communication pathways to listening processes in "real time". Such listening processes enable an upstream component, such as, for example, a "notification listener", to become aware of downstream changes in network architecture. As a non-limiting example, a status operation monitor process electronically communicates to the listening process, which is informed of downstream changes in machinery or system configurations when such changes occur, any comprises in communication pathways to the listening process as close to "real time" as possible. In other words, the status operation monitor determines whether the listening process's communication links with the downstream components are impaired. Such health status monitors may operate by, for example, periodically determining whether each of the communication pathways to the listening process are operating properly.

In one exemplary embodiment of the present invention, a system is disclosed for monitoring proper operation of a communication pathway between an EMS and an upstream notification listener. The system includes an EMS that receives a notification signal transmitted by an electronic component when a change has been made in the electronic component, a notification listener in communication with the EMS through a communication pathway, wherein the notification listener receives the notification signal from the EMS through the communication pathway, and a health checker in direct communication with both the EMS and the notification listener, wherein the health checker monitors the health status of the communication pathway by transmitting a health status signal to the EMS and detecting a reply signal from the EMS.

In another exemplary embodiment of the present invention, a system is disclosed for checking proper function of an electronic architecture that allows transmitting of real time information upstream. The system includes an EMS in communication with an electronic architecture, a signal translating device in communication with the EMS through a communication pathway, and a health checker in communication with the EMS and the signal translating device, wherein the health checker monitors proper function of the communication pathway by signaling the EMS and detecting an expected reply signal from the EMS.

In yet another exemplary embodiment of the present invention, a system is disclosed for checking the health status of an architecture for relaying information relating to changes in electronic architecture configurations. The system includes an EMS which receives a notification signal transmitted by an electronic component when a change has been made in the electronic component, means for receiving in communication with the EMS through a communication pathway, the means for receiving receives the notification signal from the EMS and translates it into a universally understandable format, and means for checking the proper operation of the communication pathway.

In another exemplary embodiment of the present invention, a method is disclosed of checking health status of a communication pathway between an EMS and a notification listener that receives notification signals from the EMS relating to changes in a system architecture. The method includes transmitting a health status signal to the EMS, and detecting a reply signal from the EMS in response to the health status signal, wherein if no reply signal is detected, then the communication pathway is not operational.

DETAILED DESCRIPTION OF PREFERRED EMBODIMENTS

The systems and methods according to the present invention utilize a universal interface between machines to enable better communication in either direction. Such a universal interface may be, for example, CORBA, which will be described in more detail below. However, the present invention is not limited to CORBA and may use any other type of universal interface that facilitates communication between two or more machines in electronic communication. Other possible languages and technologies include, but are not limited to, RPC, RMI, and COM.

Figure 1:
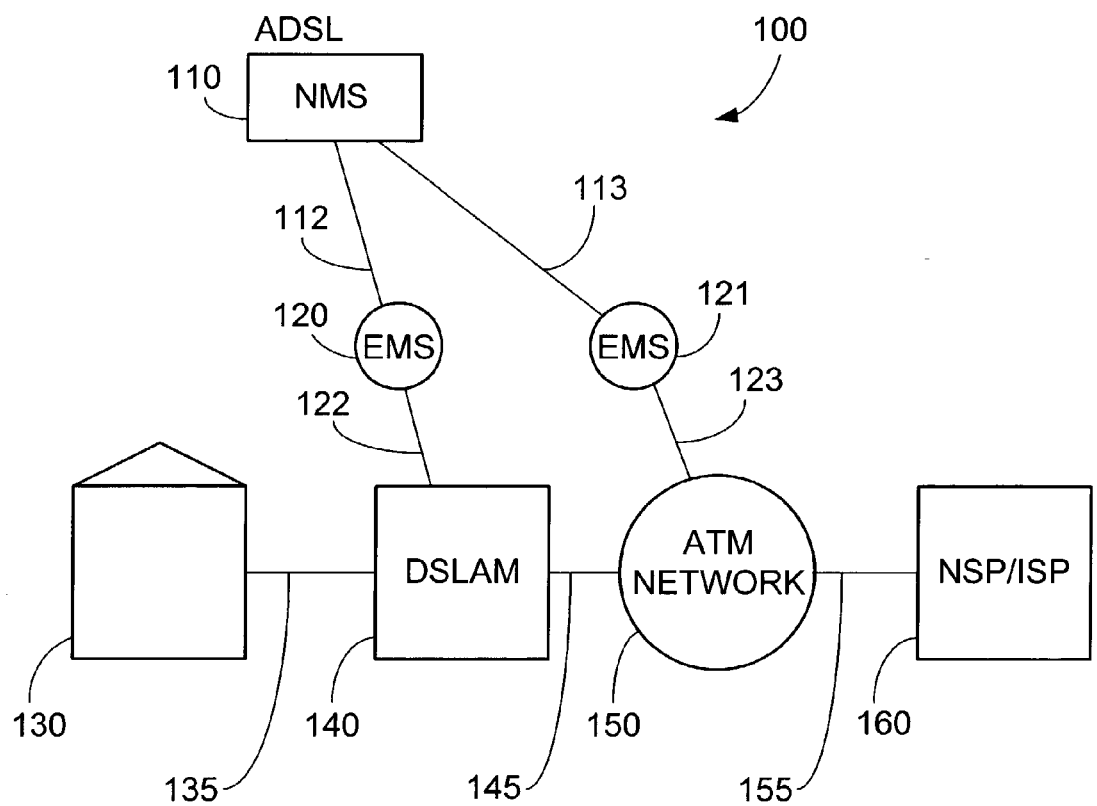
FIG. 1 shows an exemplary embodiment of an ADSL system architecture in which an NMS tests or controls various components of the system through one or more EMS.

Showing an exemplary embodiment graphically as system 100 in FIG. 1, a network management system ("NMS") 110 communicates with one or more electronic management systems ("EMS") 120 and 121 through telecommunication pathways 112 and 113, respectively. Telecommunication pathways 112, 113 and others shown here and throughout this disclosure may be any common type of electronic communication medium that connects two electronic machines, unless otherwise indicated.

A given NMS may be, for example, a telecommunications company, and may have hundreds of EMS connecting to it. The NMS 110 shown in FIG. 1 may be part of an asymmetric digital subscriber line ("ADSL") operated by, for example, a telephone or telecommunications company. Each EMS 120 and 121 has control of one or more systems or machines in communication with it. For example, EMS 120 is in communication and in control of digital subscriber line access multiplexer ("DSLAM") 140. Similarly, EMS 121 is in communication and in control of asynchronous transfer mode network 150 ("ATM NETWORK").

In exemplary system 100 shown in FIG. 1, a given user, such as a user in home 130, is in communication with DSLAM 140 through communication pathway 135. Also, DSLAM 140 is in communication with ATM NETWORK 150 through communication pathway 145. Finally, ATM NETWORK 150 is in communication with a network service provider or Internet service provider ("NSP/ISP") 160 through communication pathway 155.

A programmer using the NMS 110 system may evaluate the conditions of the downstream components DSLAM 140 and ATM NETWORK 150 through use of EMS 120 and 121, respectively. Furthermore, the proper operation of NSP/ISP 160 may also be evaluated by EMS 120 or 121. For example, to evaluate the condition of DSLAM 140, a programmer may send a signal through NMS 10 that is transmitted along communication pathway 112 to EMS 120, and along communication pathway 122 to DSLAM 140 to evaluate its condition. If DSLAM 140 is not operating properly, the return signal from DSLAM 140 back to NMS 110 may indicate a malfunction. In a similar fashion, NMS 110 may determine the proper function of ATM NETWORK 150 using EMS 121 through communication pathways 113 and 123.

Any anomalies in any component of the system 100 may be determined by NMS 110 and subsequent changes and repairs may be made. Although such a system 100 is typically effective in testing for proper operation of system components, it is "reactive" to changes that have already been made in the system. Further, system 100 does not detect a change when the change occurs but after a test signal is sent out, and is thus not "proactive" in considering such changes as they occur, for example, in "real time".

The exemplary embodiment of a reactive system 100 shown in FIG. 1 is merely one type of many possible types of reactive, synchronous systems. A more generic explanation of reactive and proactive systems is now provided for understanding the advantages realized from utilizing a proactive system, in accordance with the present invention.

Figure 2:
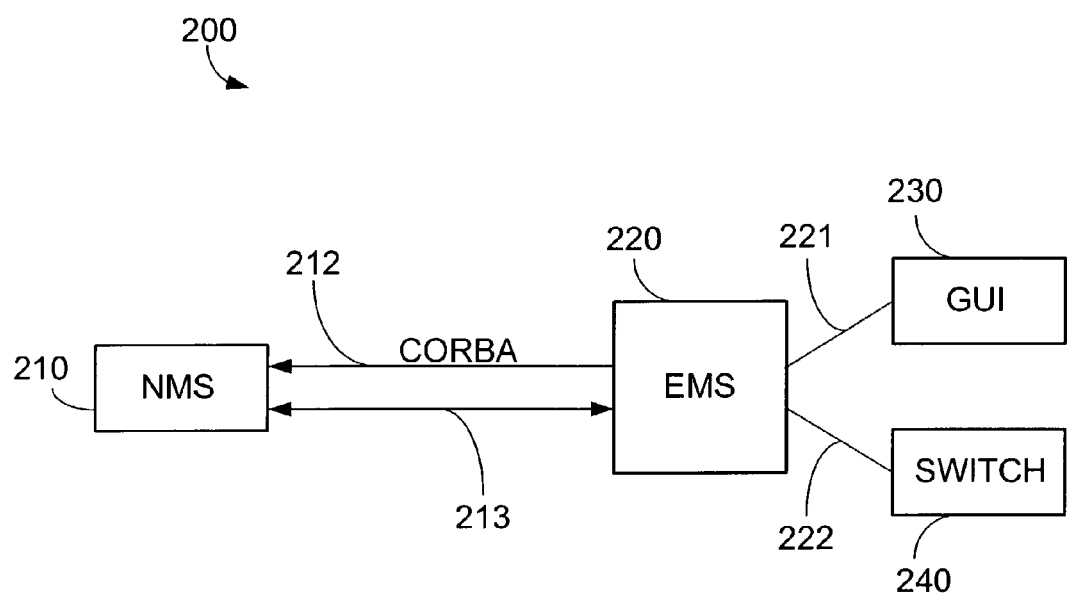
FIG. 2 shows an exemplary embodiment of a system with an NMS in communication with an EMS through several communication pathways that enable information transmission between the EMS and NMS.

A more generic example of a system having both reactive configurations, as is common in conventional systems, and proactive configurations, with exemplary embodiments of the systems or methods of the present invention shown herein, is shown as system 200 in FIG. 2. In this system 200, an NMS 210 is in communication with one or more EMS 220 through exemplary communication pathways 212 and 213. EMS 220 is also in communication through communication pathway 221 with one or more graphic user interfaces ("GUI") 230, which allow control and testing of EMS 220. Further, one or more switches 240 may also be in communication with EMS 220 through communication pathway 222.

Communication pathways 212 and 213, although they both connect NMS 210 with EMS 220, operate in different ways and therefore have different capabilities. Communication pathway 213 is based on open system interconnection ("OSI") or CORBA communications protocol and is conventionally used as a two-way communication path. For example, when a signal is sent by NMS 210 to verify the operation of a downstream switch 240, the signal travels along communication pathway 213 to EMS 220, through communication pathway 222, and to switch 240. When the status of switch 240 is determined, then a signal is sent back through communication pathway 222 to EMS 220, and then through communication pathway 213, back to NMS 210. Thus, communication pathway 213 may operate in both directions, NMS 210 to EMS 220 and EMS 220 to NMS 210, and is thereby termed "synchronous" to indicate that for a given signal that is projected from NMS 210, a corresponding return signal is returned to the NMS 210 that corresponds to, or is "in sync" with, the original NMS 210 signal.

Some of the limitations of utilizing only communication pathway 213 in system 200 become evident when a programmer changes a component or operation of the system 200 downstream of NMS 210. For example, if a programmer using GUI 230 changes a function or operation of EMS 220, for example, by changing a card stored within EMS 220, such change is not registered into NMS 210 automatically. Usually, the programmer who affected such a change downstream in system 200 contacts an operator of NMS 210 and informs the operator of the change, thereby enabling the operator to make such a change in the configurations of NMS 210 to reflect the downstream change. This requirement of the programmer downstream having to communicate "manually" any changes in the downstream component of system 200 with an operator of NMS 210 to note such changes in NMS 210 configuration upstream is both inefficient and unreliable. If, for example, the programmer fails to make the operator of NMS 210 aware of the changes, then NMS 210 is not changed to reflect the true downstream architecture, and errors could result during operation of NMS 210.

Alternatively, an operator of NMS 210 may be able to detect changes in the system 200 that have occurred downstream of NMS 210 if while a synchronous command operation through communication pathway 213, a return message is received that is unexpected or specifically indicates that a certain operation is not possible because a certain downstream component is not in operation or has been changed. Although such reactive information gathering sometimes may be helpful in understanding what downstream changes have been made, it is inefficient and may result in wasted resources if such downstream changes are difficult to detect immediately. An operator of NMS 210 who notes that certain changes may have been made in the system without notification of NMS 210, may not be able to discern what those changes were, and may have to spend wasted time and resources in determining such changes.

Thus, a need exists to efficiently and effectively communicate any downstream changes in an exemplary system 200 with the upstream NMS 210 to allow NMS memory architecture and design to be updated to reflect the true architecture of the system 200. Communication pathway 212 may be used for such an "asynchronous" system that communicates upstream any changes that have been made downstream, in near "real time". Thus such an exemplary asynchronous pathway 212 may be one directional, from downstream to upstream, and is activated upon effecting a change in the system architecture anywhere in system 200 downstream of NMS 210.

Using the same scenario described above with respect to FIG. 2 but with an "asynchronous" reaction system, if the same switch 240 is changed downstream in system 200, NMS 210 will be alerted to this change automatically by a notification message that traverses upstream through EMS 220 and through communication pathway 212 into NMS 210. To make such asynchronous messaging strategies effective and efficient, a "CORBA" interface is used in conjunction with communication pathway 212 to enable efficient and rapid inter-machine communication possible.

This "CORBA" is an alternative to the TL-1 protocol and stands for common object request broker architecture. CORBA is object-oriented, which means that the language or commands are structured in such a manner such that many machine interfaces may use it and thereby communicate effectively with each other. Thus, CORBA has the potential to unify the languages used by different electronic systems and machines into a single command language that is understandable by many different systems. A variety of systems, such as, for example, UNIX, SOLARIS, WINDOWS, DOS, and embedded systems, may support CORBA commands. Thus, CORBA may be universally supported by different computer systems that previously were not able to communicate with each other effectively.

Use of a universal command language and interface, such as CORBA, decreases time requirements for personnel, such as, for example, programmers, controllers, engineers, and technicians, who previously had to concern themselves with much detail of each new machine that was to be communicated with each existing system into the specifics of the language required by each machine. For example, when connecting a new machine to an existing system using a conventional communication line, such as for example, a TL-1 or similar line, the specific characteristics of the new machine must be considered in constructing a TL-1 command language that enables the new machine to communicate with the existing system. Such a stringent requirement is not necessary when using CORBA interface such that with CORBA, the machines are, for example, only instructed about what functions they are to perform, rather than having to the consider the specifics of the machine.

Figure 3:
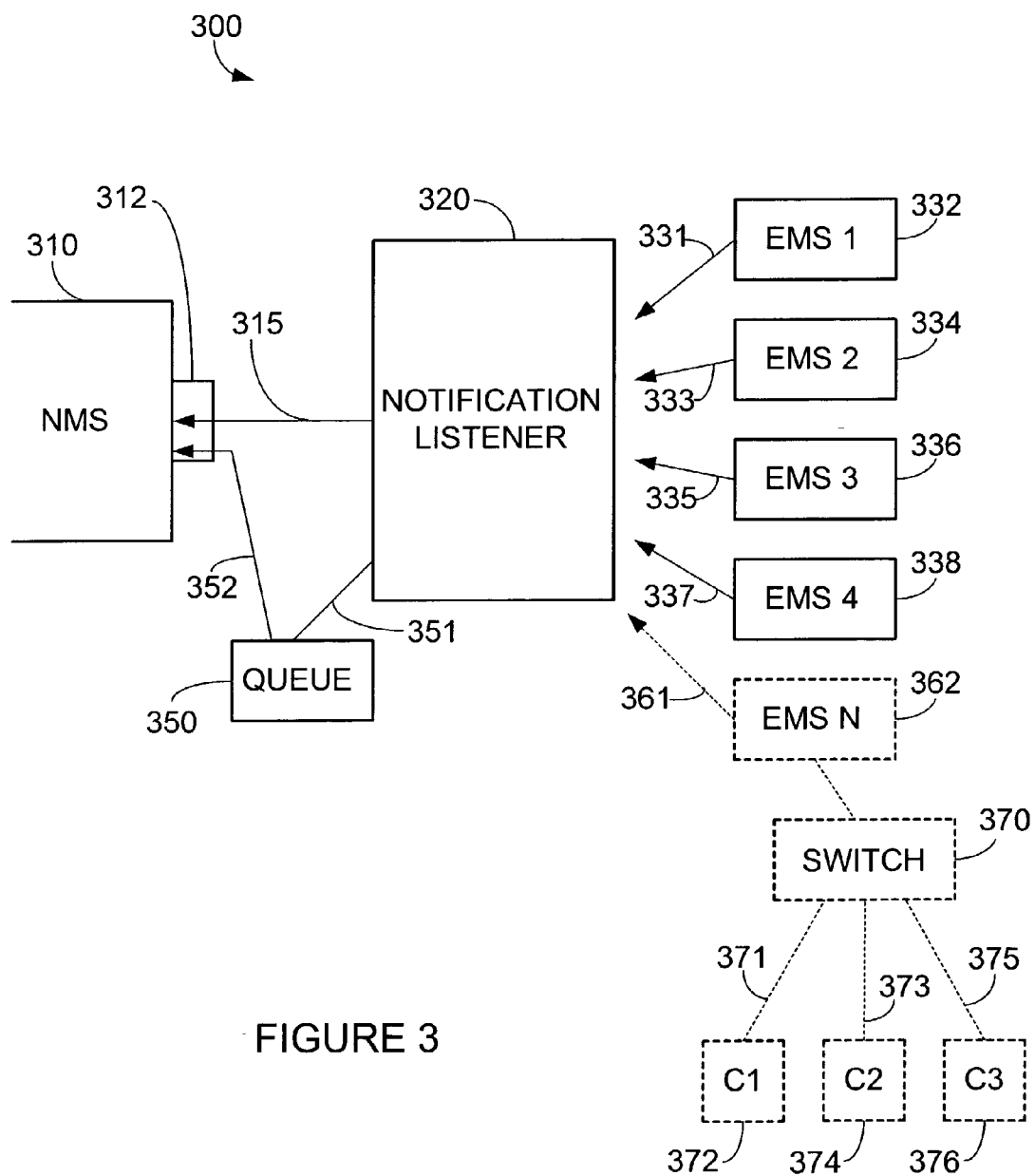
FIG. 3 shows an exemplary embodiment of a system that includes a notification listener that receives notification signals from one or more downstream EMS and transmits such signals onto an upstream NMS.

Having considered a universal interface language, such as, for example, CORBA, as the operating language of such an asynchronous notification system, another exemplary embodiment of such a system 300 is shown in FIG. 3. In system 300, an NMS 310 is located upstream in system 300 and thereby has control over the operations of the system. One or more EMS 332, 334, 336, 338, and 362 are in communication with NMS 310 through one or more communication pathways 331, 333, 335, 337, and 361, respectively.

Each such EMS 332, 334, 336, 338, and 362 may also be in communication and/or in control of one or more switches. Such additional switches and downstream components are not shown in this figure for sake of simplicity. A single exemplary switch 370 in communication with EMS 362 is shown as an example. However, each EMS, such as EMS 362, may be in communication with one or more switches or other components (not shown for sake of simplicity).

Each switch, such as, for example, switch 370, may control a given function of one or more customers 372, 374, and 376 through communication pathways 371, 373, and 375, respectively. Thus, a given NMS 310 may have control over countless components downstream, including, for example, EMS 332, 334, 336, 338, and 362, switch 370, and customers 372, 374, and 376.

In order to keep track of all such changes to the downstream components of system 300, NMS 310 may use a notification listener 320 that receives all signals of change from downstream components, translates each signal into an understandable universal format through CORBA interface, aggregates all such changes into a common nucleus, and forwards such change notifications in translated form to NMS 310. Notification listener 320 acts as a "central processing station" that receives, translates, aggregates, and filters incoming signals. Further, notification listener 320 is extensible and may expand to accommodate additional numbers of EMS inputs and other components.

Upon processing incoming notification messages from various EMS 332, 334, 336, 338, and 362, notification listener 320 unravels the message, and determines which component sent the message and what the message is. Then, notification listener 320 represents the information in a fashion that is more easily understandable by upstream NMS 310, and forwards the processed and translated messages to NMS 310 through communication pathway 315. Optionally, before the forwarded message reaches NMS 310, it first passes through a CORBA access server 312 ("CA Server"), which acts as an entry point to NMS 310 and may control and filter messages that reach NMS 310. Although NMS 310 is shown in the figures herein as a single block or component for sake of simplicity, NMS 310 may comprise two or more software components operating independently and in coordination with each other. Thus, CA Server 312 acts as a gateway to these sets of software components that in conjunction constitute NMS 310.

Any changes in system components of system 300 may be automatically relayed to NMS 310 through notification listener 320 using a common interface language, such as CORBA. A "trigger" enables the system 300 to know that a change has been made within it. This trigger may be made inherent in the hardware. For example, a trigger may be a set of higher level self diagnostic rules defined by a manufacturer. Such a trigger may be initiated by an action such as a technician physically pulling an electronic card, or a controller card trying to communicate to a lesser card but failing to do so. When such a triggerable condition is detected, the hardware may communicate this information to its controlling EMS software system. Other types of triggers, for example, based on software that periodically checks for system components, are possible.

If the CA Server 312 or NMS 310 have become non-operational because, for example, either has crashed, then messages from notification listener 320 are unable to reach NMS 310. Hence, such messages may then be re-routed through communication pathway 351 to queue handler 350, which may store the messages and all future messages that are also unable to reach NMS, in the order received. Queued messages in the queue handler 351 remain stored in queue until both CA Server 312 and NMS 310 are again operational, and any such messages are then forwarded to NMS 310 through communication pathway 352.

Notification listener 320 may detect that CA Server 312 is non-operational through a number of different ways. For example, if CA Server 312 is non-operational, attempts to communicate with it using CORBA interface will give rise to an alert condition, which may be called an "exception" in technical terms. So while notification listener 320 tries to transmit a notification to CA Server 312, and such an attempt fails and initiates an alert condition, this is an indication that something is wrong with the communication with CA Server 312. At this point, a CORBA-provided checking mechanism may be used to determine whether CA Server 312 exists at all. Such an exemplary procedure may be used by a technician to determine whether CA Server 312 is functional. Other procedures are also possible.

Although the notification listener described in each of the above exemplary embodiments is a very useful tool in automatically determining any changes in an electronic system architecture in "real time", communication pathways leading to the notification listener may malfunction and prevent information, such as notification signals from reaching the notification listener. As shown in the exemplary embodiment of FIG. 4, a system 400 may have a notification listener 420, as described above, which may be in electronic communication with one or more EMS 432, 434, and 436 through communication pathways 431, 433, and 435, respectively.

Figure 4:
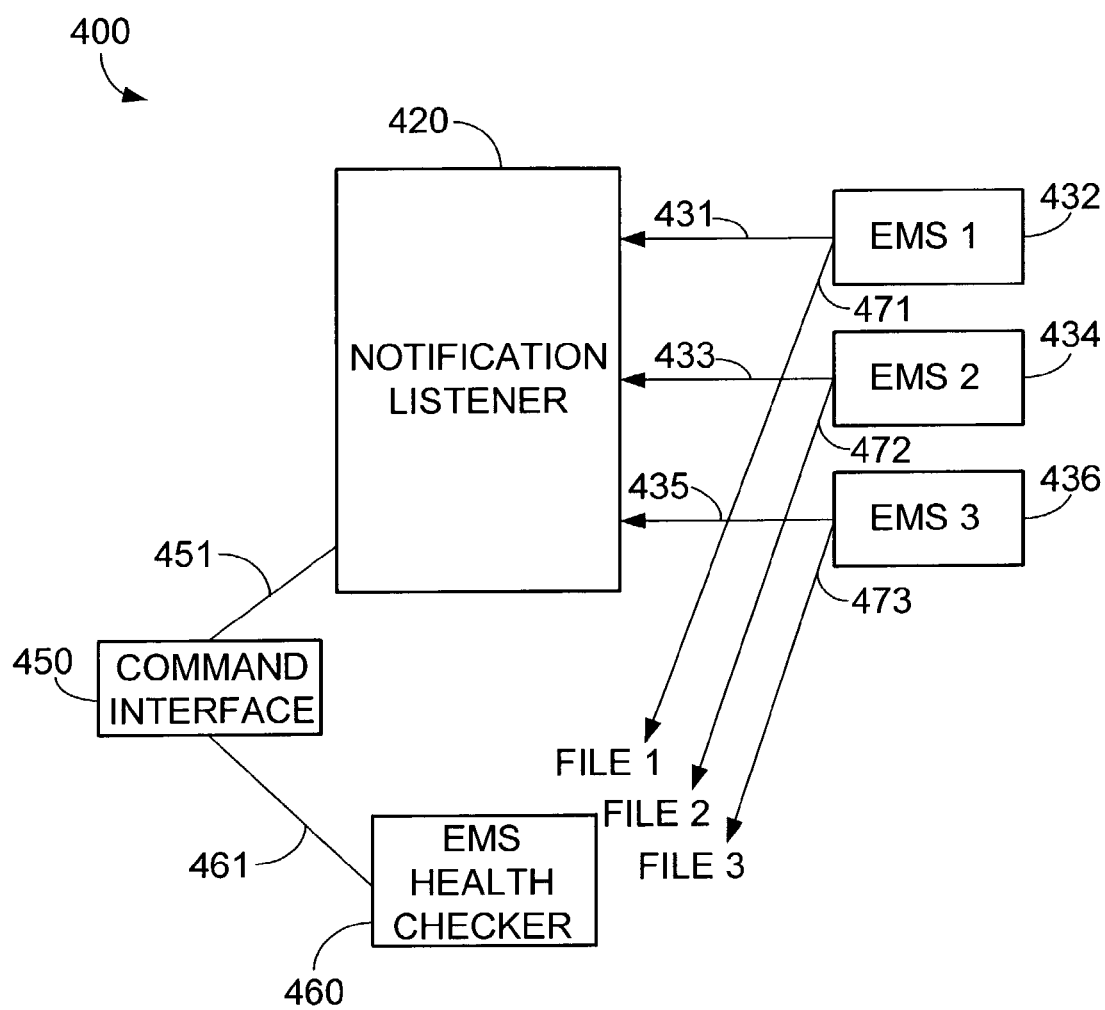
FIG. 4 shows an exemplary embodiment of a system or method according to the present invention that includes an EMS health checker that verifies the healthy operation of the communication pathways between one or more EMS that are in communication with a notification listener.

Notification listener 420 may be generally controlled or monitored by a command interface 450 through communication pathway 451. Command interface 450 enables an operator to specifically change, add, or delete EMS communication pathways to notification listener 420 or command the notification listener 420 to reconnect to a remote EMS through a given communication pathway. Other general maintenance functions are also possible through the command interface 420, which may be an integral component of notification listener 420 or may be separate and distinct component as shown in FIG. 4.

To monitor the healthy operation status of the communication pathways between notification listener 420 and corresponding EMS, EMS health checker 460 is in communication with command interface 450 through communication pathway 461. EMS health checker 460 is primarily responsible for determining that a healthy communication pathway is being maintained between notification listener 420 and any remote EMS.

There are multiple ways that EMS health checker may be used to automatically check the healthy status of the communication pathways between notification listener 420 and a given remote EMS. Although an exemplary methods is presented herein, the EMS health checker 460 is not limited to such a method, and other methods are possible. Further, in FIG. 4, EMS health checker 460 is shown separate from command interface 450 and notification listener 420 for sake of clarity, but they may be part of the same system or set of programs.

In an exemplary embodiment, EMS health checker 460 receives information from a given EMS when the EMS is electronically communicated with notification listener. For example, EMS 432, 434, and 436 communicate FILE 1, FILE 2, and FILE 3, respectively, to EMS health checker 460 when a healthy communication pathways exists between each EMS and notification listener 420. Further, EMS health checker periodically checks for such a healthy communication pathway between EMS and notification listener to ensure that any potential information from EMS would be received by notification listener 420.

One exemplary way EMS health checker 460 checks for proper communication pathway health is to transmit a signal to a given EMS and await a reply by the EMS with the given file type. For example, to determine a healthy communication pathway between EMS 432 and notification listener 420, EMS health checker 460 transmits a signal to EMS 432 and awaits a reply. If a reply is detected by EMS health checker 460, then communication pathway 431 should be healthy because the output connection of EMS 432 is transmitting signals properly.

If, however, there is no response from exemplary EMS 432, then there may be an unhealthy communication pathway. EMS health checker 460 may thus signal that pathway 431 or one or more components in it are not operating in a healthy manner. Such a determination may, for example, automatically signal for the non-healthy pathway to shut down or alert a programmer as to the defect. Optionally, when such an "unhealthy" discrepancy exists, command interface 450 may be signaled to induce notification listener 420 to re-connect to EMS 432 using communication pathway 431 to determine whether the re-connection will again establish a healthy communication pathway between notification listener 420 and EMS 432. If after command interface 450 instructs notification listener 420 to re-connect with EMS 432, and such re-connection attempt is unsuccessful, then the connection may be shut down altogether.

Because of the constant and periodic checking signal nature of EMS health checker 460 in determining a proper remote connection of EMS to a communication pathway leading to notification listener 420, such a health checking process is substantially continuous, and any unhealthy status is determined in "real time". The frequency of health checking may be set to correspond to a reasonable rate of signal checking without overburdening the system 400.

The exemplary systems and methods described above according to the present invention have many advantages. One such advantage is the automated nature of the health checker system. Whenever a downstream change is made in an electronic architecture under the control of a specific NMS, the system enables that NMS to become aware of the change in the architecture through a notification signal derived from the point of change in the architecture. In other words, the specific area that receives a change in status notifies its controlling NMS upstream that the change has been made and that the NMS should make note of such a change in its cumulative architecture of the entire system. Such "asynchronous" notification signals are constantly being transmitted upstream through durable and efficient CORBA lines that enable fast object-oriented communication between components and machines in the communication lines between the point of change and the desired upstream NMS. The automated health checker promotes the proper operation of the system in real time and may serve to automatically fix any problem that may exist by, for example, re-connecting the components, and/or alerting programmers of an unhealthy condition.

Another unique advantage of the systems and methods according to the present invention is its ability for rapid expansion and thus determining health status of communication pathways of an ever-increasing system. New EMS modules may be added to an existing architecture very rapidly without typical concerns associated with TL-1 lines, such as, for example, concerns with the details of the machines and systems being added. Use of CORBA in attaching new system components and machines enable rapid expansion because of CORBA's characteristic object-oriented language protocol that does not require component or machine specifics.

Using the exemplary systems and methods described herein, the proper communication of EMS information to an upstream NMS via a notification listener may be automatically monitored when an NMS system is automatically notified of signals downstream that communicate changes in, for example, network creation/deletion notifications, configuration changes of ADSL network equipment, fault and alarms of network equipment, and other signals that an NMS system should be aware of. In response to such signals, NMS may make note of such changes and change the architecture of the entire network within its memory, reply with its own commands, or notify a programmer that such changes have been made, thereby letting the programmer be aware of changes that may need immediate attention, such as, for example, network failure.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

We claim:

1. A system for monitoring proper operation of a communication pathway between an EMS and an upstream notification listener, the system comprising:

at least two EMS wherein each EMS receives a notification signal transmitted by at least one electronic component when a change has been made in the electronic component;

a notification listener in communication with each EMS through a communication pathway, wherein the notification listener receives the notification signal from each EMS through its own communication pathway, and wherein the notification listener receives notification signals from all electronic components in communication with each EMS, translates each notification signal into a universally understandable format, and forwards the translated notification signals to a network management system application, wherein the translated notification signals are automatically forwarded to the network management system application and wherein the notification signals communicate changes in network creation and deletion notifications, configuration changes of asymmetric digital subscriber line network equipment, network equipment faults, and network equipment alarms;

a health checker in communication with each EMS via the notification listener, wherein the health checker monitors the health status of the communication pathways by transmitting a health status signal to each EMS and detecting a reply signal from each EMS; and a command interface in communication with the notification listener and the health checker, wherein the command interface controls the notification listener and wherein the command interface is utilized to perform at least one of changing, adding, and deleting the communication pathways to the notification listener.

2. The system of claim 1, further comprising:

a plurality of EMS, each in communication with the notification listener, and wherein each EMS has its own unique alphanumeric string that is communicated back to the health checker upon detecting the health status signal from the health checker.

3. The system of claim 2, wherein the health checker determines that a particular communication pathway between a particular EMS and the notification listener is non-operational when the particular EMS does not reply with its unique alphanumeric string when the health status signal is transmitted to the particular EMS from the health checker.

4. The system of claim 1, wherein communication pathways between system elements utilize a universally understandable format based on an object-oriented language.

5. The system of claim 4, wherein the universally understandable format is CORBA interface.

6. The system of claim 1, wherein the health checker periodically and continuously transmits the health status signals to any EMS that should be in communication with the notification listener to constantly monitor the communication pathway between any EMS and the notification listener.

7. A system for checking the health status of an architecture for relaying information relating to changes in electronic architecture configurations, the system comprising:

a plurality of EMS wherein each EMS receives notification signals transmitted by a plurality of electronic components when a change has been made in an electronic component;

means for receiving in communication with each EMS through a synchronous and an asynchronous communication pathway, the means for receiving receives the notification signal from each EMS and translates it into a universally understandable format, wherein the translated notification signals are automatically forwarded to a network management system and wherein the notification signals communicate changes in network creation and deletion notifications, configuration changes of asymmetric digital subscriber line network equipment, network equipment faults, and network equipment alarms;

means to queue the translated messages after being received in communication with the means for receiving;

means to control and filter the translated notification messages in communication with the means for receiving;

means for checking and establishing the proper operation of the communication pathways; and a command interface in communication with the means for receiving and the means for checking, wherein the command interface controls the means for receiving and wherein the command interface is utilized to perform at least one of changing, adding, and deleting the communication pathways in communication with the means for receiving and each EMS.

8. The system of claim 7, further comprising:

the plurality of EMS, each in communication with the means for receiving, and wherein each EMS has its own unique alphanumeric string that is communicated back to the means for checking upon detecting a health status signal from the means for checking.

9. The system of claim 8, wherein the means for checking determines that a particular communication pathway between a particular EMS and the means for receiving is non-operational when the particular EMS does not reply with its unique alphanumeric string when the health status signal is transmitted to the particular EMS from the means for checking.

10. The system of claim 2, wherein communication pathways between system elements utilize a universally understandable format based on an object-oriented language.

11. The system of claim 10, wherein the universally understandable format is CORBA interface.

12. The system of claim 7, wherein the means for checking periodically and continuously transmits the health status signals to any EMS that should be in communication with the means for receiving to constantly monitor the communication pathways between any EMS and the means for receiving.

* * * * *